United States Patent [19]

Gillming, Jr.

[11] Patent Number: 5,402,596
[45] Date of Patent: Apr. 4, 1995

[54] FLOATING HOLDER FOR WADING FISHERMAN'S ACCESSORIES

[76] Inventor: Gerald L. Gillming, Jr., 911 Main St., Galena, Kans. 66739

[21] Appl. No.: 96,300

[22] Filed: Jul. 26, 1993

[51] Int. Cl.⁶ ............................................. A01K 97/00
[52] U.S. Cl. ............................. 43/54.1; 206/315.11; 224/920
[58] Field of Search ................. 43/17.1, 54.1; 206/315.11; 224/920, 922; 114/364, 255

[56] References Cited

U.S. PATENT DOCUMENTS

| | | | |
|---|---|---|---|
| 1,927,110 | 9/1933 | Bannister | 43/54.1 |
| 3,678,611 | 7/1972 | Files | 43/54.1 |
| 4,638,593 | 1/1987 | Garcia | 43/54.1 |
| 4,747,490 | 5/1988 | Smith | 206/315.11 |
| 4,841,660 | 6/1989 | James | 43/54.1 |
| 4,869,195 | 9/1989 | Eichfeld | 114/364 |
| 4,996,790 | 3/1991 | Ruggles | 43/54.1 |
| 5,050,526 | 9/1991 | Nelson | 224/920 |
| 5,159,777 | 11/1992 | Gonzalez | 43/54.1 |
| 5,163,694 | 11/1992 | Reichek | 43/54.1 |

Primary Examiner—Kurt Rowan

[57] ABSTRACT

A floating holder for a wading fisherman's accessories (e.g. fishing rods, tackle and coolers) is comprised of a floating platform having a flat bottom and a plurality of fishing rod supports. The floating holder also has hooks or similar means for attaching the holder to one end of a tow line while the other end of the tow line can be attached to the fisherman such that as the fisherman wades through the water the floating holder will be towed along behind him. The floating holder can also have a hook or similar means for supporting a fish stringer or fish bag as well as a lighting means for safe night fishing.

8 Claims, 4 Drawing Sheets

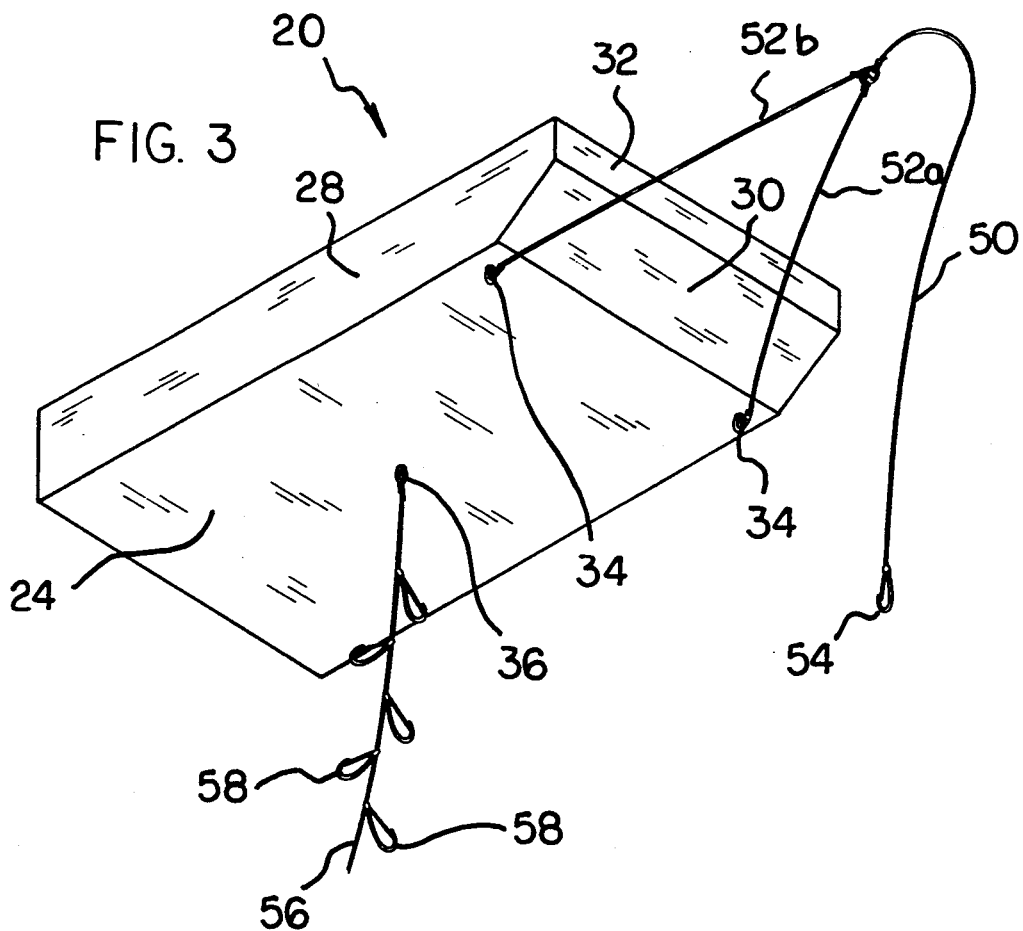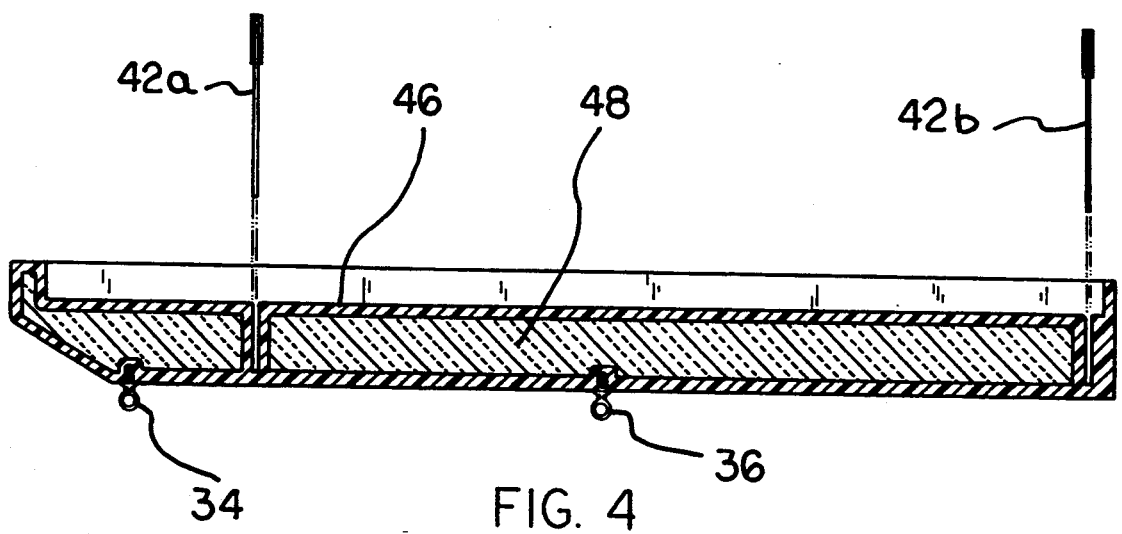

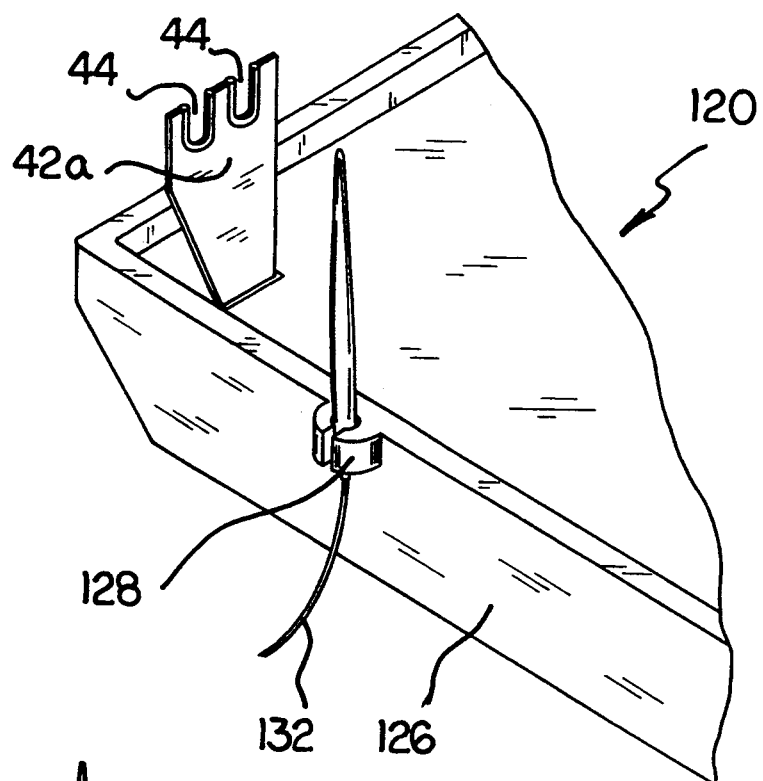
FIG. 5
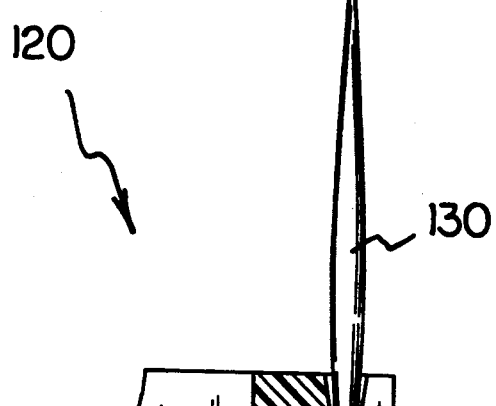
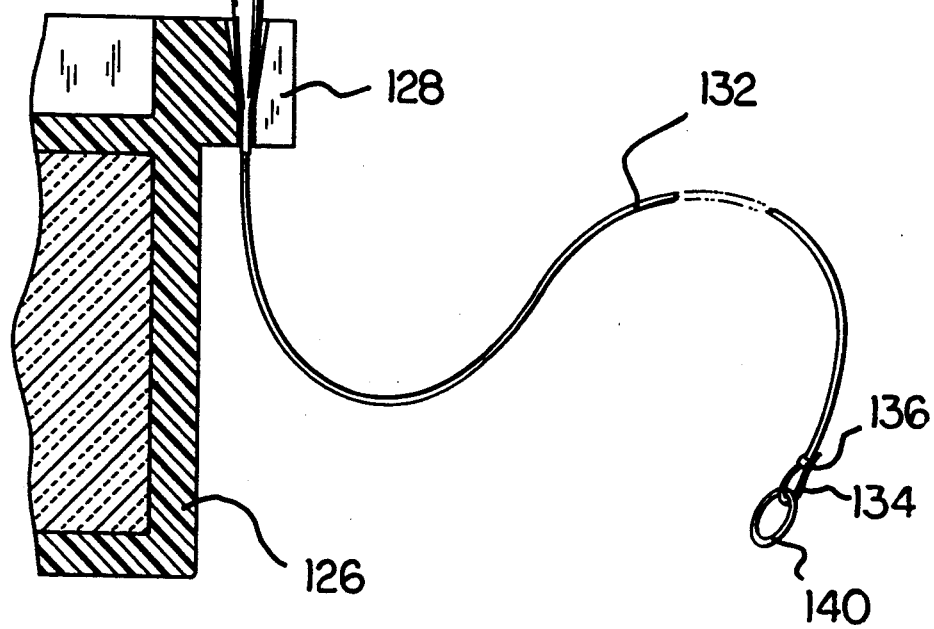
FIG. 6

FLOATING HOLDER FOR WADING FISHERMAN'S ACCESSORIES

BACKGROUND OF THE INVENTION

1. Field of the Invention

The present invention relates generally to devices for fishermen, and more particularly, to a floating platform especially adapted to hold the accessories of a wading fisherman.

2. Description of the Prior Art

Fishing accessories in the form of fishing tackle floats are known in the prior art of sporting goods. For example, U.S. Pat. No. 4,638,593 discloses a floating boat shaped fishing accessory having an enclosed hull and U.S. Design Pat. U.S. Pat. No. 309,937 discloses a fishing tackle float. These prior art devices have tubular rod holders from which the held rods, supported only at a single location near their handles, rise up away from the floating device making the floating device unstable.

Thus, while the foregoing body of prior art indicates it to be well to have floating fishing accessories, the provision of a more simple and cost effective device is not contemplated. Nor does the prior art described above teach or suggest a floating accessory holding device which may be used by wading fishermen to hold up to four fishing rods plus other accessories such as a cooler, a tackle box, containers of bait, and the like in a highly stable and buoyant manner. The foregoing disadvantages are overcome by the unique floating holder for a wading fisherman's accessories of the present invention as will be made apparent from the following description thereof. Other advantages of the present invention over the prior art also will be rendered evident.

SUMMARY OF THE INVENTION

To achieve the foregoing and other advantages, the present invention, briefly described, provides a floating holder for the accessories of a wading fisherman (e.g. fishing rods, tackle and coolers) comprised of a floating platform having a flat bottom and a plurality of fishing rod supports, each rod supported in at least two places along its length to give the platform stability. The floating holder also has hooks or similar means for attaching the holder to one end of a tow line while the other end of the tow line can be attached to the fisherman such that as the fisherman wades through the water he will tow the floating holder behind him. The floating holder can also have a hook or similar means for supporting a fish stringer or fish bag as well as a lighting means for safe night fishing.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new floating holder for wading fisherman's accessories which has all of the advantages of the prior art and none of the disadvantages.

It is another object of the present invention to provide a new floating holder for wading fisherman's accessories which may be easily and efficiently manufactured and marketed.

It is a further objective of the present invention to provide a new floating holder for wading fisherman's accessories which is of durable and reliable construction.

An even further object of the present invention is to provide a new floating holder for wading fisherman's accessories which is susceptible of a low cost of manufacture with regard to both materials and labor, and which accordingly is then susceptible of low prices of sale to the consuming public, thereby making such floating holder for wading fisherman's accessories available to the buying public.

Yet still a further object of the present invention is to provide a new floating holder for wading fisherman's accessories made of highly buoyant materials and having supports for holding up to four fishing rods, each rod supported in at least two positions along the rod's length to provide the floating holder with good stability.

Still yet a further object of the present invention is to provide a new floating holder for wading fisherman's accessories having hooks or other attaching means for attaching a tow line so that the holder will float along and follow the fisherman as he maneuvers through the water.

It is even still a further object of the present invention to provide a new floating holder for wading fisherman's accessories which is highly stable and buoyant even when supporting up to four fishing rods and a cooler and/or a tackle box or the like.

Still a further object of the present invention is to provide a new floating holder for wading fisherman's accessories including means for providing lighting enabling safe night-time fishing.

It is even yet still a further object of the present invention to provide a new floating holder for wading fisherman's accessories which, because of its high level of buoyancy, can double as a personal safety flotation device in an emergency situation.

Still yet even a further object of the present invention is to provide a new floating holder for wading fisherman's accessories having an elevated lip area around its perimeter to keep objects from falling or rolling into the water.

An even still further object of the present invention is to provide a new floating holder for wading fisherman's accessories having a stringing means attached for stringing fish and holding them in the water until the fisherman is finished fishing.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 3 is a perspective view from below of the preferred embodiment of FIGS. 1 and 2 of the present invention.

FIG. 4 is a cross-sectional side view of the floating holder for wading fisherman's accessories of FIGS. 1-3 in accordance with the present invention.

FIG. 5 is a partial perspective view in elevation of a second preferred embodiment of the present invention.

FIG. 6 is a partial cross-sectional side view showing the second preferred embodiment of FIG. 5 in accordance with the present invention.

DESCRIPTION OF THE PREFERRED EMBODIMENT

Figure 1:
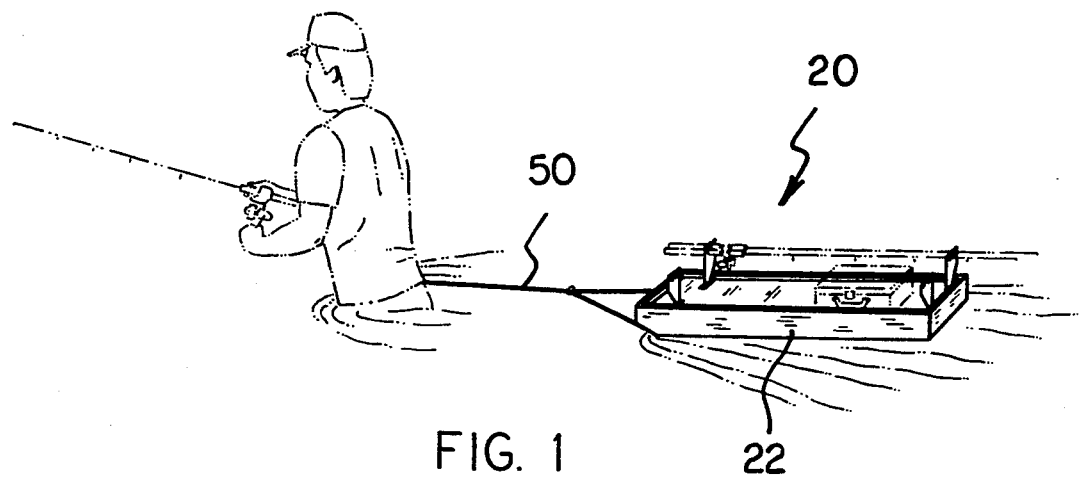
FIG. 1 is a perspective view showing the first preferred embodiment of the floating holder for wading fisherman's accessories of the present invention being used by a wading fisherman.

With reference now to the drawings, a new floating holder for wading fisherman's accessories embodying the principles and concepts of the present invention will be described.

Turning initially to FIGS. 1-4, there is shown a first exemplary embodiment of the floating holder for wading fisherman's accessories of the invention generally designated by reference numeral 20. In its preferred form, floating holder for wading fisherman's accessories 20 comprises generally a platform 22. The platform 22 preferably has a flat bottom 24, a left side wall 26 and a right side wall 28, and an angled front wall 30 with a flat top part 32 of the front wall, and a flat rear wall 31.

Hooks 34a and 34b can be mounted to the bottom 24 of the platform 22 for attaching tow lines 52a and 52b respectively. Another hook 36 can be mounted near the center of the bottom 24 of the platform 22 for attaching a fish stringer 56 or a fish bag.

Figure 2:
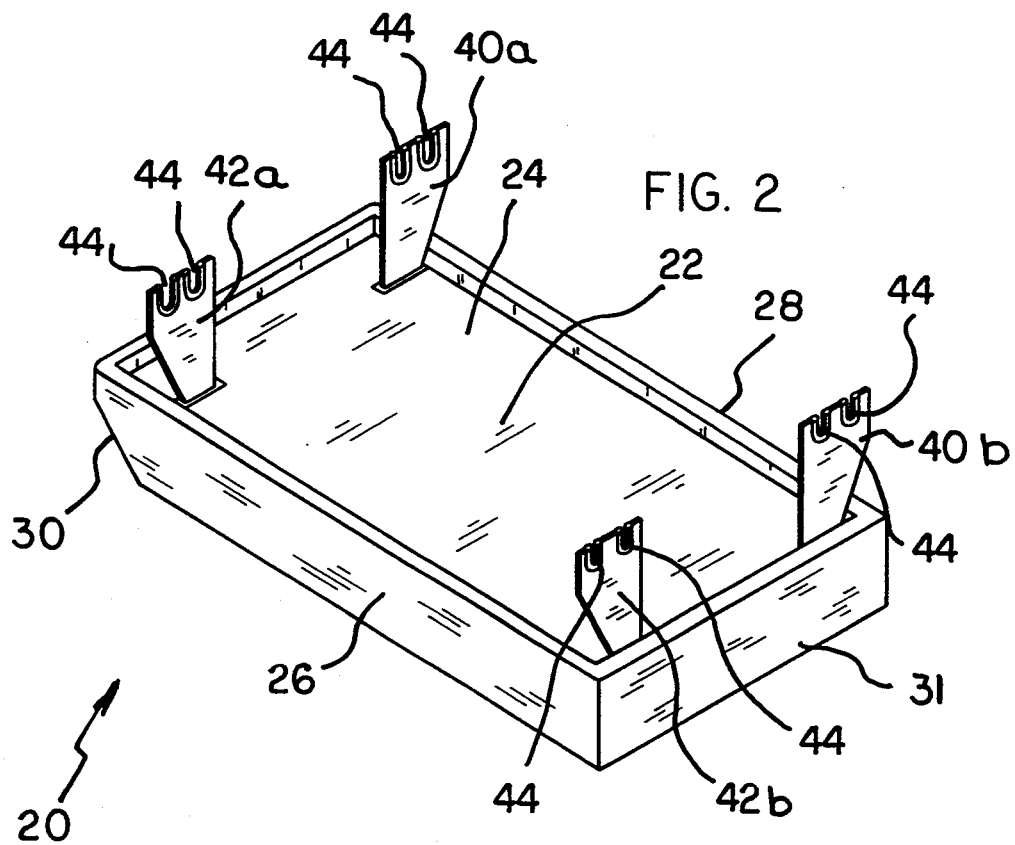
FIG. 2 is a perspective elevational view of the floating holder for wading fisherman's accessories of FIG. 1 in accordance with the present invention.

The floating platform 22 also has means for holding one or more fishing rods such as the right front rod rack 40a, right back rod rack 40b, left front rod rack 42a and left back rod rack 42b shown in FIG. 2. Each of the rod racks (42a, 42b, 42c, and 42d) have two U-shaped rod holders 44. Each rack preferably comprises a substantially flat elongate plate member having a shank portion insertable into a corresponding slot in platform 22 in a manner best seen in FIG. 4; and with each shank portion terminating in an upper portion in the top edge of which is disposed a pair of U-shaped notches suitably sized to receive therein a portion of a fishing rod, or the like. One fishing rod runs between a U-shaped rod holder 44 in front and a U-shaped rod holder 44 in back. Thus, in the preferred embodiment of the floating platform 22 shown in FIG. 2, four fishing rods could be properly held.

Referring to FIG. 4, the main body sections of the floating platform 22 (bottom 24 and walls 26, 28, 30, 31 and 32) are preferably made of a plastic outer shell 46 covering a foam core 48. This construction should enable the platform 22 to float even if it flips or fills up with water.

The platform 22 can be attached to the belt of a wading fisherman by means of a tow line 50 preferably having a snap hook 54 for attaching the tow line 50 to the fisherman's belt. The tow line 50 preferably splits into two split sections 52a and 52b for attaching to the hooks 34a and 34b in the bottom of the platform. The use of the two hooks 34a and 34b gives more directional support to the platform 22 than the use of one hook, though using only one hook or more than two hooks should be considered within the scope of the invention.

As mentioned above, another hook 56 can be mounted on the bottom of the platform 22 near its center for attaching a fish holding bag or a fish stringer such as the fish stringer 56 having hooks 58 shown in FIG. 3.

The tops of side walls 26 and 28 and upper front wall 32 and rear wall 31 preferably extend up to a height higher than the flat bottom 24 to create a raised barrier lip around the perimeter of the bottom 24. The formed perimeter lip will help keep objects from falling or rolling out of the platform 22.

Use of the floating holder 20 for wading fisherman's accessories of the first preferred embodiment of the present invention is very easy. A fisherman loads up the holder 20 with up to four fishing rods in the racks and places on the flat bottom 24 any cooler, tackle box, or any other containers the fisherman wants to take with him into the water. The fisherman attaches the snap hook 54 to his belt or belt loop and then carries the platform 22 and places it in the water. As the fisherman wades out into the water and maneuvers around, the floating platform 22 floats around behind him until it is needed, at which time the fisherman can pull the tow line 50 to bring the platform 22 to him.

A second embodiment floating holder 120 for wading fisherman's accessories is shown in FIGS. 5 and 6. The second embodiment is similar to the first embodiment with the addition of a modified left side wall 126 having a grasping retainer piece 128 attached. The retainer piece 128 is preferably integrally constructed with the side wall 126. The retainer piece 128 is adapted to hold a fish impaler 130 fixed to a fish stringer 132. At the end of the fish stringer 132 is an attaching loop 134 held by a clamp 136 for fixing the stringer to a fish stopping ring 140.

Use of the second embodiment floating holder 120 for wading fisherman's accessories is similar to that of the first embodiment with the addition that when a fish is caught he can be impaled through his gills or lip on the impaler 130 and then slid to the end of the impaler 130. The impaler 130 can then be lifted out of the retainer piece 128 and the fish will slide down to the end of the stringer 132. The first fish caught will be stopped by the ring 140 and later fish will be stopped by the preceding fish. A fisherman only needs to use one hand to string fish using the fish stringer of the second embodiment.

Figure 7:
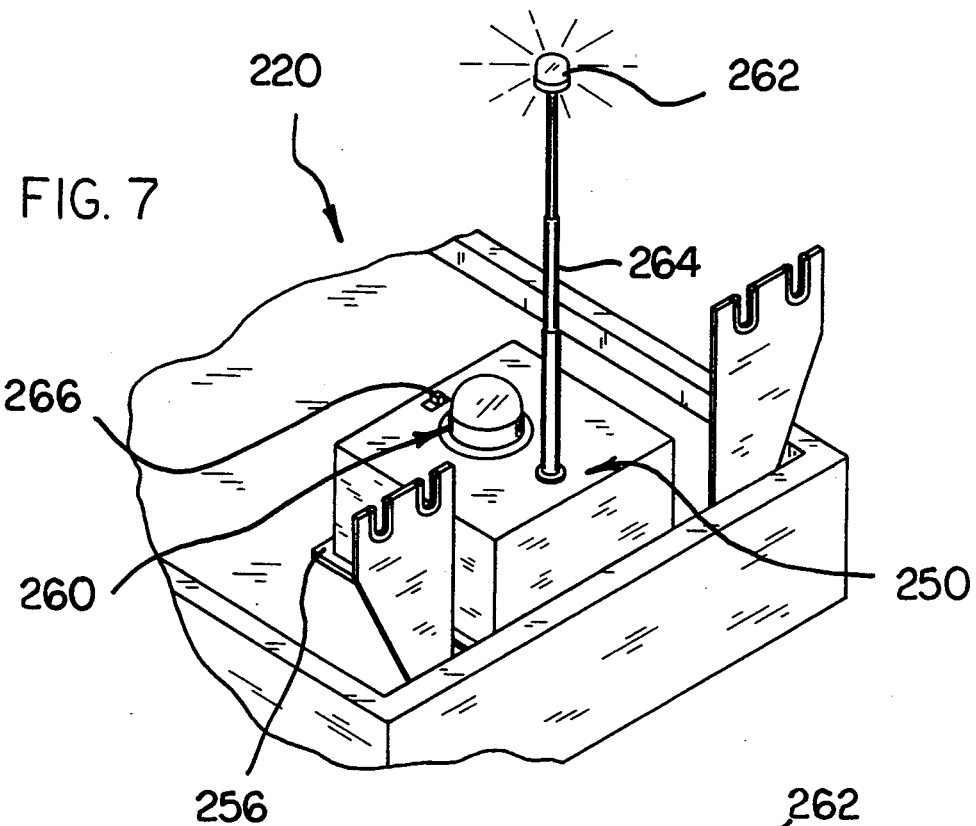
FIG. 7 is a perspective view in elevation of a third preferred embodiment of the present invention.
Figure 8:
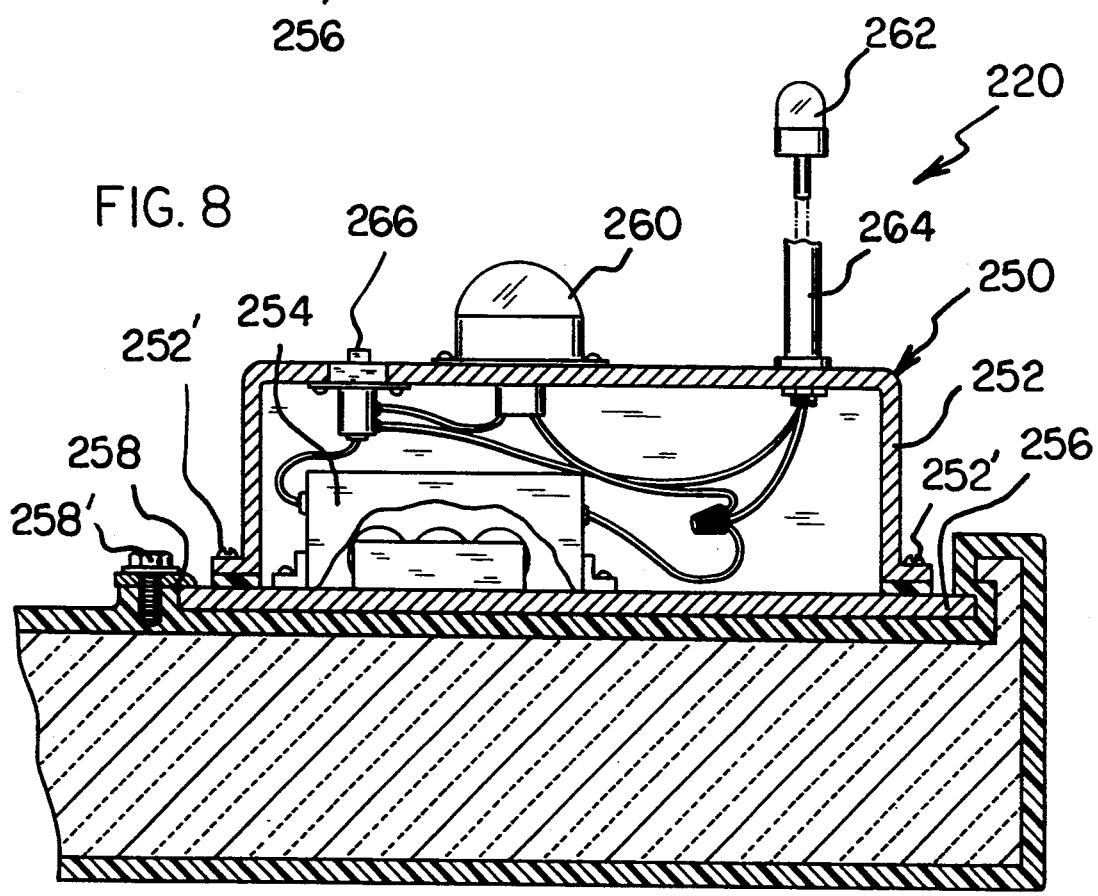
FIG. 8 is a partial cross-sectional side view of the third preferred embodiment of FIG. 7 of the present invention.

A third preferred embodiment floating holder 220 for wading fisherman's accessories is shown in FIGS. 7 and 8. The third embodiment is also similar to the first preferred embodiment with the addition of a lighting system 250. The lighting system 250 is comprised of a light housing box 252 which can be held in place by means of screws 252' to a base plate 256 underneath the box 252. Inside of housing box 252 is a power box 254 for holding batteries and other electrical components. The bade plate 256 can be held in position by means of retaining piece 258 which, itself, can be held in position by means of one or more screws 258' (one screw 258' shown in FIG. 8) for retaining piece 258.

The lighting system 250 preferably has a dome light 260 for night fishing and a warning light (preferably a strobe type light) 262 for areas with heavy boat traffic to give a warning that someone (the wading fisherman) is in the water. The strobe light 262 preferably has a telescoping support 264. An on/off switch 266 can be used to turn the lighting system 250 on when needed (at night or in dark fishing spots) or off when not needed.

Use of the third embodiment is again simple and similar to use of the first embodiment with the addition of being able to use the lighting system 250 when needed.

Using the various preferred embodiments of the present invention, a wading fisherman can carry up to five fishing rods with him as he fishes (four on the platform and one in his hand) as well as being able to carry other items such as coolers, tackle boxes and the like.

The holder 20 of the present invention is very buoyant and stable. The holder 20 could be used as a personal safety floatation device in the case of an emergency.

The preferred size of the holder 20 is approximately thirty two inches long and twenty four inches wide with a depth of four inches (and two inches in the front). Of course any suitable size could be used and should be considered within the scope of the invention.

It is apparent from the above that the present invention accomplishes all of the objectives set forth by providing a new floating holder for a wading fisherman's rods and other accessories made up of: a buoyant flat bottom platform; at least one means for holding at least one of the fishing rods in at least two locations along the length of the fishing rod, the at least one means for holding at least one of the fishing rods being supported by the flat bottom platform; and a towing means which can be attached to both the fisherman or his clothing and to the platform, enabling the fisherman to tow the flat bottom platform as he wades through the water. The at least one means for holding at least one fishing rod can be a plurality of U-shaped slots raised above the bottom of the flat bottom platform, the U-shaped slots adapted to support at least one of the fisherman's fishing rods. The towing means can comprise a tow line which can be attached at one end to the front of the platform and at the other end to the fisherman by a temporary attaching means. The temporary attaching means can be a snap hook. The invention can further have a means for attaching a fish stringing device to the platform. The invention can further have at least one light providing means whereby the platform can be used and the fisherman can safely fish at night. The platform can act as an personal safety flotation device in an emergency situation. The platform can have a flat bottom with a raised lip around the perimeter of the flat bottom to prevent objects from falling out of the holder. The means for holding at least one of the fishing rods can be a means for holding four of the fishing rods. The platform can be constructed of a plastic outer shell covering a highly buoyant foam core.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A floating holder for a wading fisherman's fishing rods and other accessories comprising:
   a buoyant platform;
   said platform having a top surface and a peripheral lip member surrounding said top surface and extending upwardly therefore to form a retaining wall whereby fishing accessories may be supported on said top surface and retained thereon by said retaining wall;
   at least one means for holding at least one of the fishing rods in at least two locations along the length of the fishing rod, said at least one means for holding at least one of the fishing rods being supported by said flat bottom platform;
   said at least one means comprising a pair of plate members, each said plate member having a top portion terminating in an upwardly facing edge and a bottom portion defining a substantially flat stake portion, said upwardly facing edge having a U-shaped notch therein for receivably supporting said fishing rod, said top surface of said buoyant platform having at least a pair of spaced slots therein for removably receiving the shank portion of a corresponding plate member such that the U-shaped notch in the upwardly facing edge therein is located above said retaining wall when said plate members are received within said corresponding slots in said top surface; and a towing means which can be attached to both the fisherman or his clothing and to said platform, enabling the fisherman to tow said buoyant platform as he wades through the water.

2. The invention of claim 1 wherein said towing means comprises a tow line which can be attached at one end to the front of said platform and at the other end to the fisherman by a temporary attaching means.

3. The invention of claim 2 wherein said temporary attaching means is a snap hook.

4. The invention of claim 3 further comprising a means for attaching a fish stringing device to said platform.

5. The invention of claim 3 further comprising at least one light providing means whereby said platform can be used and the fisherman can safely fish at night.

6. The invention of claim 3 wherein said platform can act as an personal safety flotation device in an emergency situation.

7. The invention of claim 1 wherein said means for holding at least one of the fishing rods is a means for holding four of the fishing rods and the upwardly facing edge of each of said plate members has a pair of juxtaposed U-shaped notches therein, respectively.

8. The invention of claim 1 wherein said platform is constructed of a plastic outer shell covering a highly buoyant foam core.

* * * * *